United States Patent Office 3,029,060
Patented Apr. 10, 1962

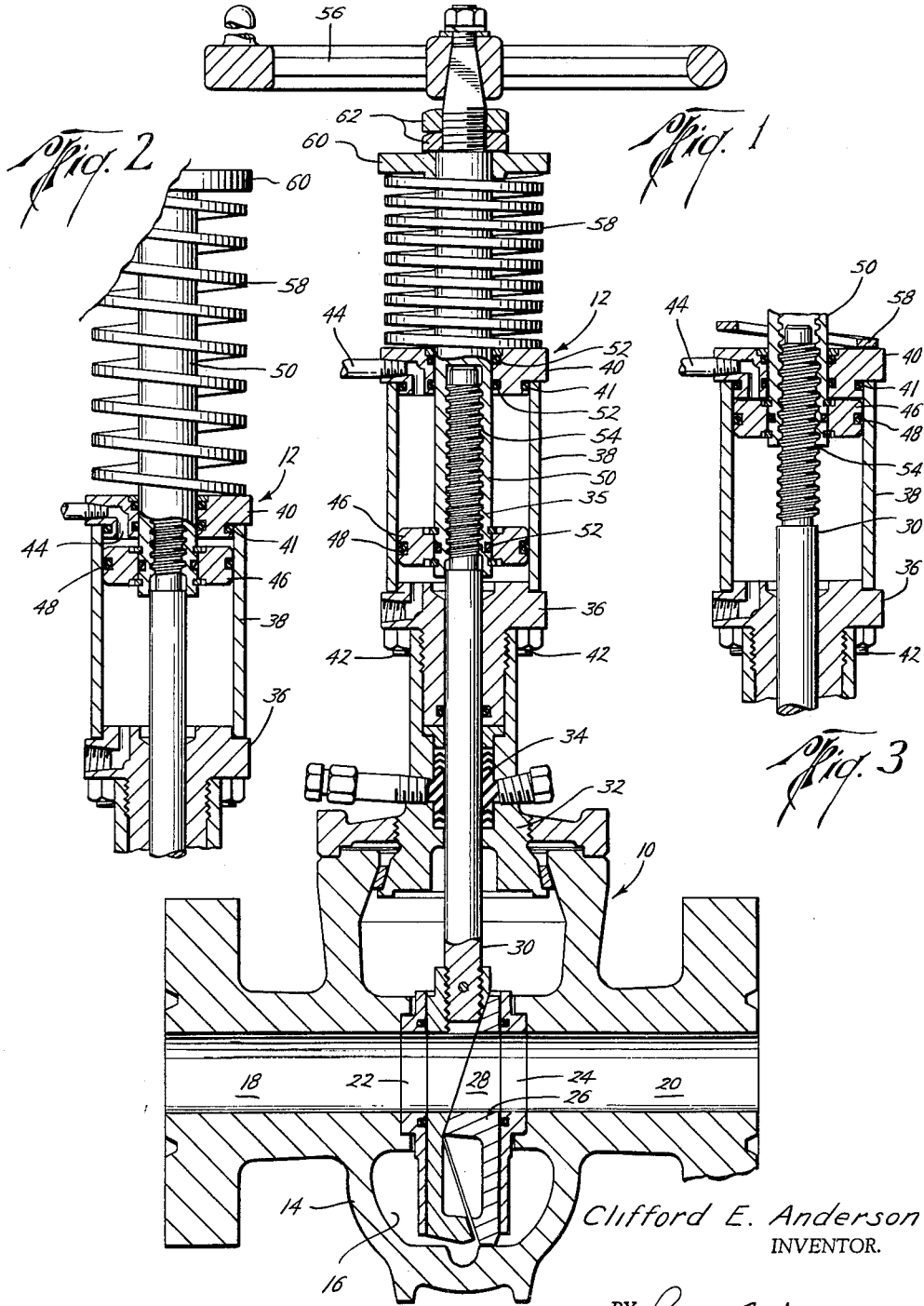

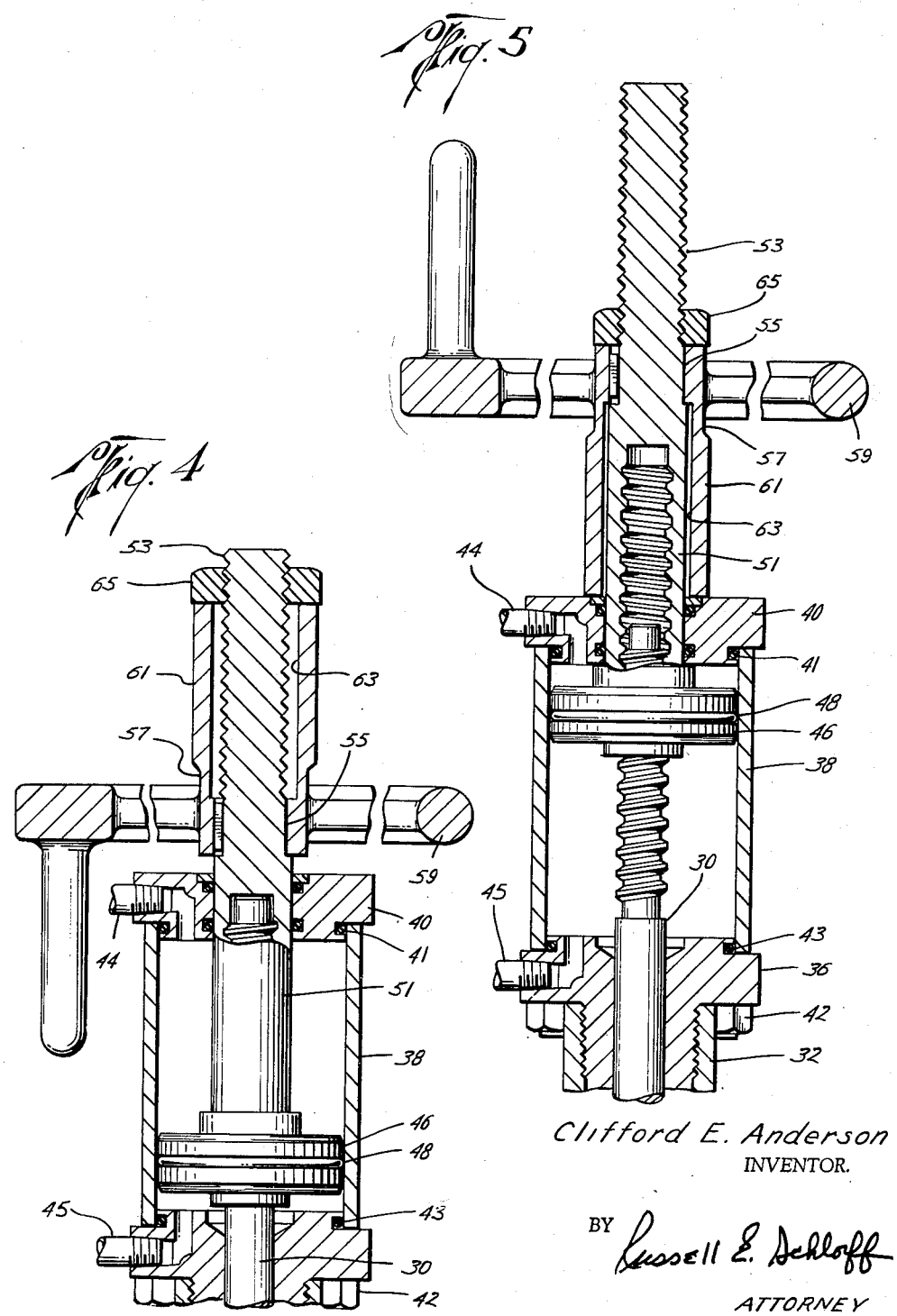

3,029,060
MANUAL OPERATING MEANS FOR PISTON OPERATED VALVES
Clifford E. Anderson, Houston, Tex., assignor to ACF Industries, Incorporated, New York, N.Y., a corporation of New Jersey
Filed Dec. 18, 1957, Ser. No. 703,683
6 Claims. (Cl. 251—14)

This invention relates to a piston operated gate valve incorporating a manual operating means.

Due to the remote locations of oil wells and pipelines, it is often desirable that valves at such locations be provided with means permitting remote control. Remote or automatic control is essential for automation programs. One common method of providing such control has been to attach a hydraulic piston operator to the stem of a rising stem gate valve. By pressurizing one side or the other of the piston, the valve can be opened or closed from a point remote from the valve. To provide fail-safe operation in the event that one of the lines carrying hydraulic fluid to the operator is ruptured or for some other reason the remote control system fails, it is desirable to provide such valves with means to automatically position the valve in a predetermined setting. In such event, it is also desirable to have the valve provided with means permitting manual operation.

In one form of the present invention all of these functions are accomplished. A rising stem valve is provided with a piston operator. To insure that the valve will automatically completely close in the event that remote control system fails, a spring is attached to the top of the operator. The spring is of a sufficient magnitude so that if pressure on the piston fails, the valve will automatically completely close. By locating the port in bottom half of the gate, the valve will automatically open upon failure of the remote control system. To permit manual operation of the valve after such failure and automatic positioning, manual operating means are provided. The stem of the valve is threaded into the stem of the operator and by rotating the handwheel attached to the stem of the operator, the stem of the valve disengages from its connection with the stem of the operator and manually moves the gate. The manual operating feature can also be incorporated in piston operated valves which do not have the fail-safe feature.

It is a primary object of the present invention to provide manual operating means for remote controlled piston operated valves.

It is a general object to provide a piston operated gate valve incorporating means for automatic fail-safe positioning and manual operation.

It is another object to provide simple efficient means for manually operating a piston operated valve.

Other and further objects of the invention will be obvious upon an understanding of the illustrative embodiments about to be described, or will be indicated in the appended claims, and various advantages not referred to herein will occur to one skilled in the art upon employment of the invention in practice.

Preferred embodiments of the invention have been chosen for purposes of illustration and description and are shown in the accompanying drawings, forming a part of the specification, wherein:

FIG. 1 is a vertical sectional view of the valve of the present invention incorporating both the fail-safe and manual operating feature.

FIG. 2 is a vertical section of the operator shown in FIG. 1 after the fail-safe feature has functioned.

FIG. 3 is a view similar to FIG. 2 during manual operation.

FIG. 4 is a vertical sectional view of a piston operator incorporating the manual operating feature.

FIG. 5 is a view similar to that shown in FIG. 2 showing the operation of the manual operating means.

Referring now to FIG. 1, a rising stem gate valve 10 is provided with a piston operator 12. While the gate valve 10 illustrated is generally similar to that shown and fully described in Laurent's U.S. Reissue Patent No. 20,101 and Patent 2,582,996, the present invention can be utilized on any rising stem type gate valve.

The housing 14 of the valve 10 is formed of a casting within which a chamber 16 is formed to receive the operating parts of the valve. Extending from the chamber 16 are aligned flow passages 18 and 20. The inner ends of the flow passages are provided with seats 22 and 24. Interposed between the seats 22 and 24 is a two piece gate assembly 26. The gate assembly 26 has a passage 28 which registers with the passages 18 and 20 in open position and a solid portion which blocks flow in closed position. As will be explained subsequently, locating the passage 28 in the top half of the gate assembly will cause the valve to automatically close upon loss of pressure in the remote control system and locating the passage in the bottom half of gate assembly, will cause the valve to automatically open. The gate assembly 26 is constructed in accordance with the disclosure of the aforementioned Laurent reissue patent and expands in open and closed positions to isolate the body from the flow passages. Attached to the top of the gate 26 is a stem 30 which extends through a bonnet 32 and packing 34. Movement of the stem 30 results in corresponding movement of the gate 26. The upper end of the stem is provided with male threads 35, the purpose of which will be explained subsequently.

Attached to the top of the bonnet 32 is the piston operator 12. The body of the operator is comprised of a base member 36, threadedly attached to the top of the bonnet 32, a piston cylinder 38 and a cap 40 closing the top end of piston cylinder 38. Threaded members 42 connect the cap 40 with the base member 36 to make the body a unitary structure. An O-ring seal 41 is located in a groove in the cap 40 to hold pressure in the cylinder between the cap 40 and sliding piston 46 which is the working mechanism of the operator. To make the area between the piston and cap a pressure area, the circumferential edge of the piston 46 is also provided with seal 48. The piston 46 is attached to a shaft 50. Various O-ring seals 52 are utilized to prevent leakage around the shaft 50. The lower end of the shaft 50 is provided with female threads 54 which are threadedly engaged with the male threads 35 of the stem 30 connecting the working mechanism of the operator 12 with the working mechanism of the valve 10. The shaft 50 extends through the cap 40 and its end is formed to receive a handwheel 56. A spring 58 is interposed between the cap 40 and a spring retaining collar 60 which is retained in position by nuts 62 threadedly attached to the shaft.

To supply hydraulic fluid to the piston, the cap 40 is provided with a port 44 through which hydraulic fluid can pass to the top of the piston 46. In an operator provided with the spring 58, which insures automatic closing upon a decrease of pressure on top of the piston 46, it is not necessary to provide a fluid supply port in the base member 36; however, for interchangeability of base members with an operator without the fail-safe feature, the base member 36 is provided with a port 45 which is used as a vent.

Assuming that the valve is in the position shown in FIG. 1 and the pressure on the top of the piston 46 fails, the spring 58 being no longer opposed by the pressure holding it collapsed will expand to insure automatic closing the valve. The expansion will cause the shaft 50 and stem 30 to move upward causing the gate 26 to also move and cover the ports 22 and 24 thereby closing the valve. This action will move the piston 46 to the position shown in FIG. 2. If it is desired to open the valve before the restoration of the remote control circuit, the valve can be opened by the manual operating means. To manually operate the valve, the handwheel 56 is rotated. The direction of rotation will depend upon the hand of the thread. For example, if left hand threads are used, the rotation will be clockwise. The rotation of the handwheel 56 causes the threads in the shaft 50 and on the stem 30 to partially disengage. Since downward movement of the stem 30 is resisted by drag of the gate, resistance to the packing and pressure in the body, and there is no appreciable resistance to the upward movement of the piston, the piston 46 will move up until it strikes against the bottom wall of the cap 40, see FIG. 3. When it contacts the cap 40, the piston 46 can no longer move and continued rotation of the handwheel 56 will cause the stem 30 to move downward opening the valve. The spring 58 will be compressed slightly to balance against the internal friction of the valve. To restore the valve to remote operation, it is necessary to restore the stem 30 and shaft 50 to full threaded engagement. To accomplish this, the handwheel 56 is rotated in the direction opposite to that which it was rotated to manually operate the valve. In the event that it is desired to lock the valve against remote operation, it can be left in manual position.

FIGS. 4 and 5 illustrate the invention as applied to an operator not having the automatic fail-safe feature. The operator is essentially the same as that shown in FIGS. 1 to 3, and the same reference characters will be used except where the operator parts differ.

The body of the operator is comprised of the base 36 which can be threadedly attached to the bonnet 32 of a valve, the piston cylinder 38 and the cap 40 which closes the top of the piston cylinder. The body is joined together by threaded members 42. The working mechanism is comprised of the sliding piston 46 which has its circumferential edge provided with the seal 48. Since pressure will be applied to both sides of the piston 46, it will be necessary to have packing 43 at the bottom of the cylinder as well as the packing 41 found in the first form. The stem 30 of the valve is threadedly connected to the shaft 51 of the operator. The shaft 51 is slightly different than the shaft 50 in that instead of having the end formed to receive the hub of a handwheel, the end is provided with threads 53 for a distance equal to substantially the travel of the piston 46. At the base of the threads 53, the shaft 51 is provided with a formation 55 which will receive the tub 57 of the handwheel 59. The hub 57 has an extension 61, slightly shorter than the length of the threads 53, which has a bore 63 which will telescope over the threads 53. A nut 65 holds the handwheel 59 in position. Hydraulic fluid can be supplied to the top of piston 46 through port 44 and to the bottom through port 45. The hydraulic system will be controlled by proper valving as is well known in the art.

Assuming that the hydraulic system operating the valve has failed in the position shown in FIG. 4 and it is necessary to change the position of the valve, such operation can be accomplished with the manual operating means. The handwheel 59 is rotated until it can no longer turn, the direction of rotation being such as to cause the shaft 51 to unthread from its engagement with the stem 30. Since downward movement of the stem 30 is resisted by the drag of the gate, resistance to the packing and pressure in the body, and there is no appreciable resistance to the upward movement of the piston, the piston 46 will move upward until it strikes against the bottom wall of the cap 40, see FIG. 5, at which point further upward movement of the piston will be arrested. Such movement of the piston 46 causes the shaft 51 to extend from the cap an amount approximating the travel of the valve. The handwheel 59 is then removed from the shaft 51, and turned over and reattached, see FIG. 5. The cap 40 holding the piston 46, restrains any further outward movement of the shaft 51 and the hub extension 61 prevents any inward movement; therefore on rotation of the handwheel 59, the stem 30 and shaft 51 threadingly re-engage causing the stem 30 and gate of the valve to move. Since the stem and shaft are fully reengaged, the valve can be again remotely operated.

Broadly, the invention contemplates the incorporation of means for manually operating a piston operated valve by threadedly connecting the stem of the valve with the shaft and the operator with means to restrain the shaft during manual operation of the valve. The operator can be utilized on any type valve having a rising stem.

As various changes may be made in the form, construction and arrangements of the parts herein without departing from the spirit and scope of the invention and without sacrificing any of its advantages, it is to be understood that all matter herein is to be interpreted as illustrative and not in a limiting sense.

I claim:

1. A valve comprising a housing having aligned flow ports intercepted by a chamber, a reciprocating gate valve member in said chamber having a port in the upper portion to align with said flow ports in open position and a solid portion to stop flow in closed position, a stem attached to said valve member, a bonnet closing the top of the valve chamber, said stem extending through said bonnet, the top end of said stem being provided with threads, a hydraulic cylinder having a cap closing the axial outer end attached to the valve, a reciprocating piston in said cylinder, a shaft attached to said piston and extending through the cap of the cylinder, the bottom end of said shaft being provided with threads which are threadingly engaged with the threads of the stem, means to rotate the shaft attached to the top end of the shaft, a spring exerting force on the top end of the shaft, the spring being of sufficient magnitude that if the upper end of the cylinder is not pressurized, the spring will cause the shaft to move outward insuring automatic closing of the valve, said spring also being of sufficient magnitude that after such movement it will resist inward movement of the shaft upon rotation of the shaft whereby upon rotation shaft and stem will partially threadingly disengage and re-engage to manually operate the valve.

2. In a valve operator for a valve having a reciprocating stem for gate operation terminating in a male threaded portion, attaching means, a fluid power motor secured to said attaching means, said fluid power motor having a piston and a cap closing the axial outer end of said motor, means supplying fluid to one side or the other of said piston, a rotatable operator shaft attached to said piston and extending through the cap of said motor, the operator shaft having internal female threads which are threadedly engaged with the male threads of the valve stem, means to rotate the operator shaft means to limit axial outward movement of the operator shaft and means to substantially continuously resist movement of the operator shaft toward the motor upon rotation of the shaft whereby rotation of the shaft will cause the piston to contact the cap and further rotation of the shaft will cause the stem to partially disengage and re-engage from its threaded connection with the shaft and reciprocate the stem without further substantial axial movement of the shaft.

3. In a valve operator for a valve having a reciprocating stem for gate operation terminating in a male threaded portion, attaching means, a fluid power motor secured to said attaching means, said fluid power motor having a piston and a cap closing the axial outer end of said motor, means supplying fluid to one side or the other of said piston, a rotatable operator shaft attached to said piston and extending through the cap of said motor, the operator shaft having internal female threads which are threadedly engaged with the male threads of the valve stem, means to rotate the operator shaft, means to limit axial outward movement of the operator shaft, a spring interposed between the end of said motor and means to rotate the operator shaft of sufficient magnitude to substantially continuously resist movement of the operator shaft toward the motor upon rotation of the shaft whereby rotation of the shaft will cause the piston to contact the cap and further rotation of the shaft will cause the stem to partially disengage and re-engage from its threaded connection with the shaft and reciprocate the stem without further substantial axial movement of the shaft.

4. In a valve operator for a valve having a reciprocating stem for gate operation terminating in a male threaded portion, attaching means, a fluid power motor secured to said attaching means, said fluid power motor having a piston, means supplying fluid to the outer side of said piston, a rotatable operator shaft attached to said piston and extending outward of said motor, the operator shaft having internal female threads which are threadedly engaged with the male threads of the valve stem, means to rotate the operator shaft, a spring exerting force on the outer end of the operator shaft, said spring of sufficient magnitude that upon release of fluid from the top of said piston the spring will extend to move the shaft and stem outward, said spring being of sufficient magnitude that upon extension the shaft can be rotated to cause the stem to partially disengage and re-engage from its threaded connection without substantial movement of the shaft toward the motor.

5. In a valve operator for a valve having a reciprocating stem for gate operation terminating in a male threaded portion, attaching means, a fluid power motor secured to said attaching means, said fluid power motor having a piston and a cap closing the axial outer end of said motor, means supplying fluid to one side or the other of said piston, a rotatable operator shaft attached to said piston and extending axially outward of said motor through said cap, means on said shaft to limit axial outward movement of the operator shaft the outwardly extending portion of said shaft provided with male threads, the piston end of said operator shaft having internal female threads which are threadingly engaged with the male threads of the valve stem, a handwheel removably mounted on the outwardly extending portion of said shaft, said handwheel having a hub extension which during power operation of the operator extends outwardly of the handwheel and which in manual operation of the operator is positioned between the cap and the handwheel after the operator shaft is at its extended position to resist movement of the operator shaft toward the motor whereby rotation of the shaft will cause the stem to partially re-engage and disengage from its threaded connection with the shaft thereby reciprocating to operate the valve without further axial movement of the shaft.

6. The operator specified in claim 5 characterized in that the hub extension is of sufficient length to be positioned between the cap and the handwheel when the piston is near the top of the motor.

References Cited in the file of this patent

UNITED STATES PATENTS

| Re. 20,007 | Hall | June 16, 1936 |
| 1,922,190 | Atterbury | Aug. 15, 1933 |
| 1,970,963 | Hose | Aug. 21, 1934 |
| 2,624,659 | Haug | Jan. 6, 1953 |
| 2,704,947 | Hopkins | Mar. 29, 1955 |
| 2,738,945 | Shafer | Mar. 20, 1956 |

FOREIGN PATENTS

| 221,809 | Great Britain | of 1926 |